No. 826,711. PATENTED JULY 24, 1906.
A. F. DAVIS.
GRINDING MILL.
APPLICATION FILED MAY 16, 1904.
5 SHEETS—SHEET 3.
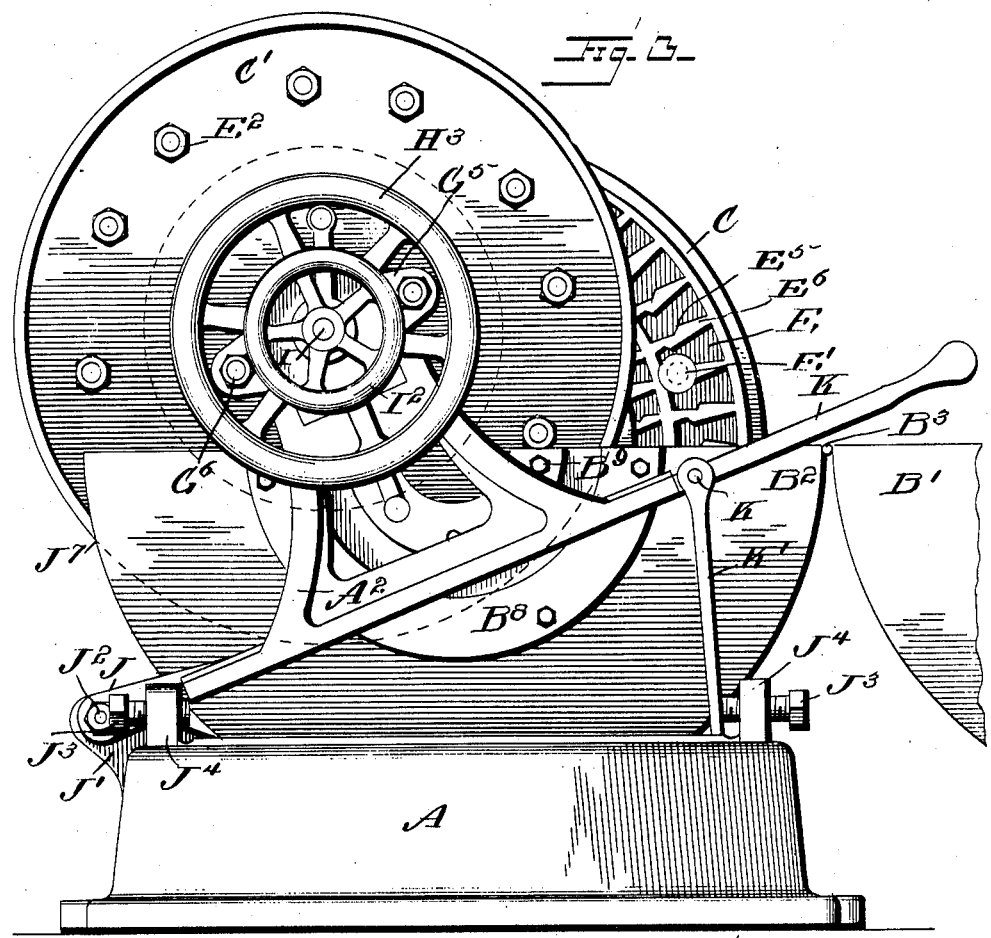
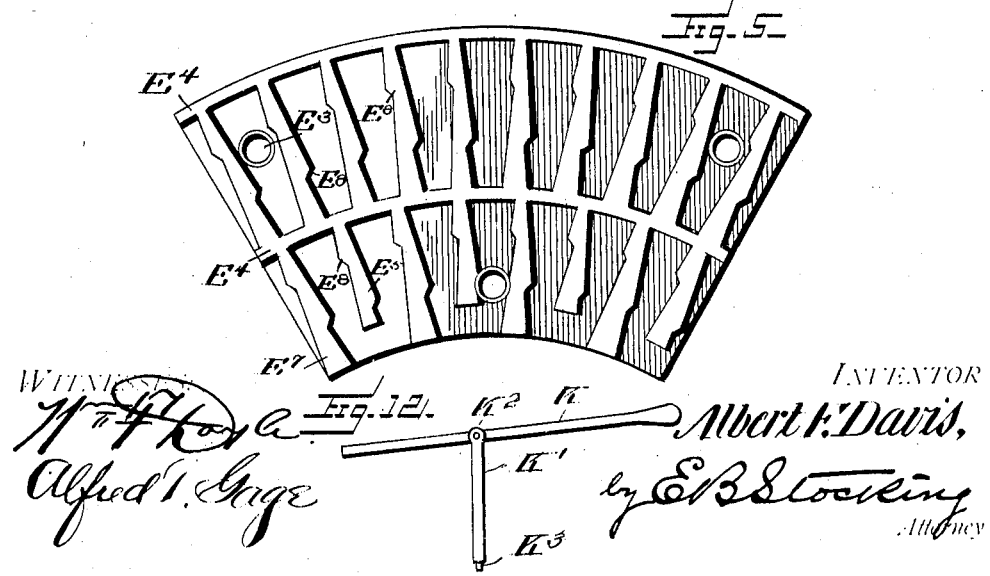

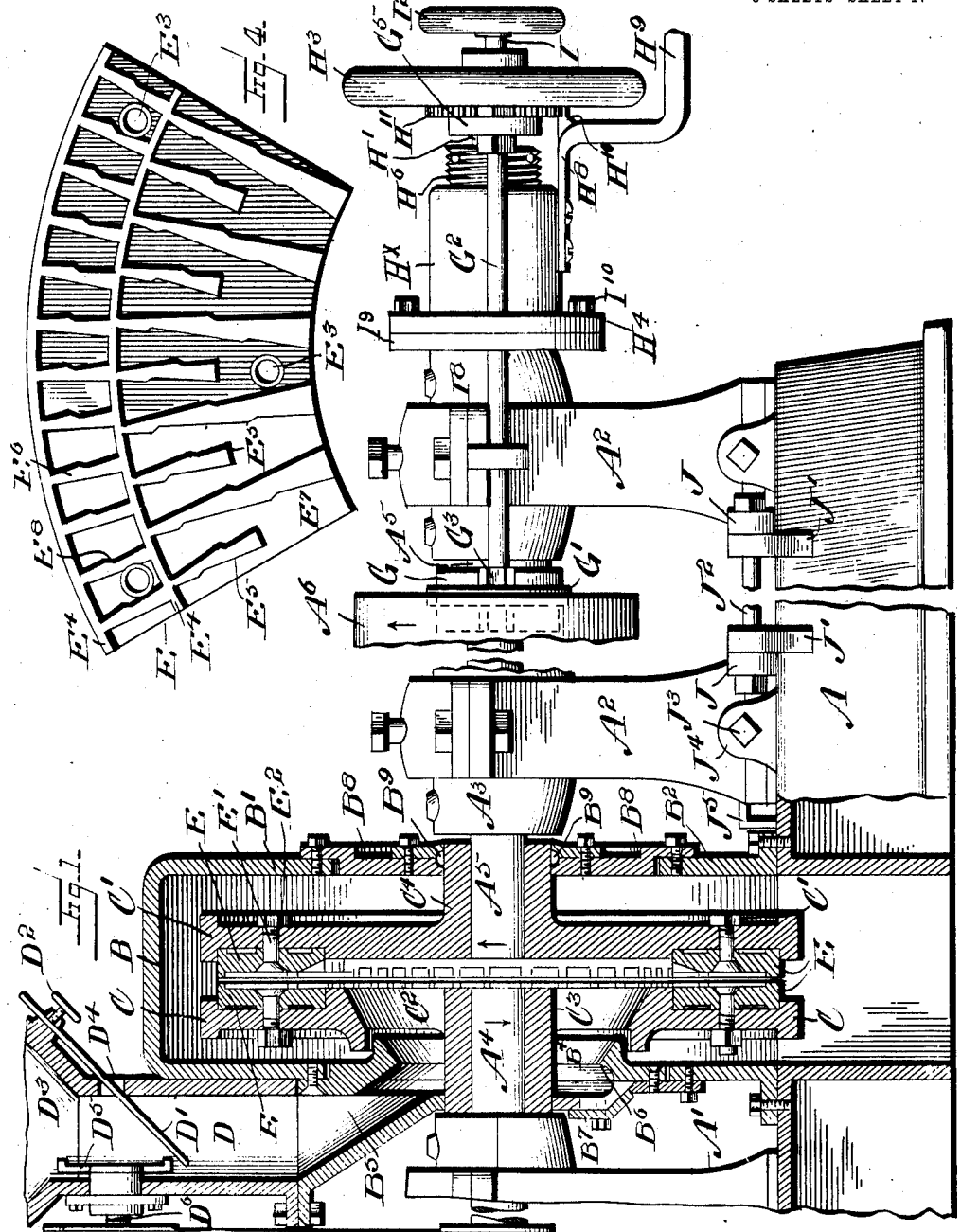

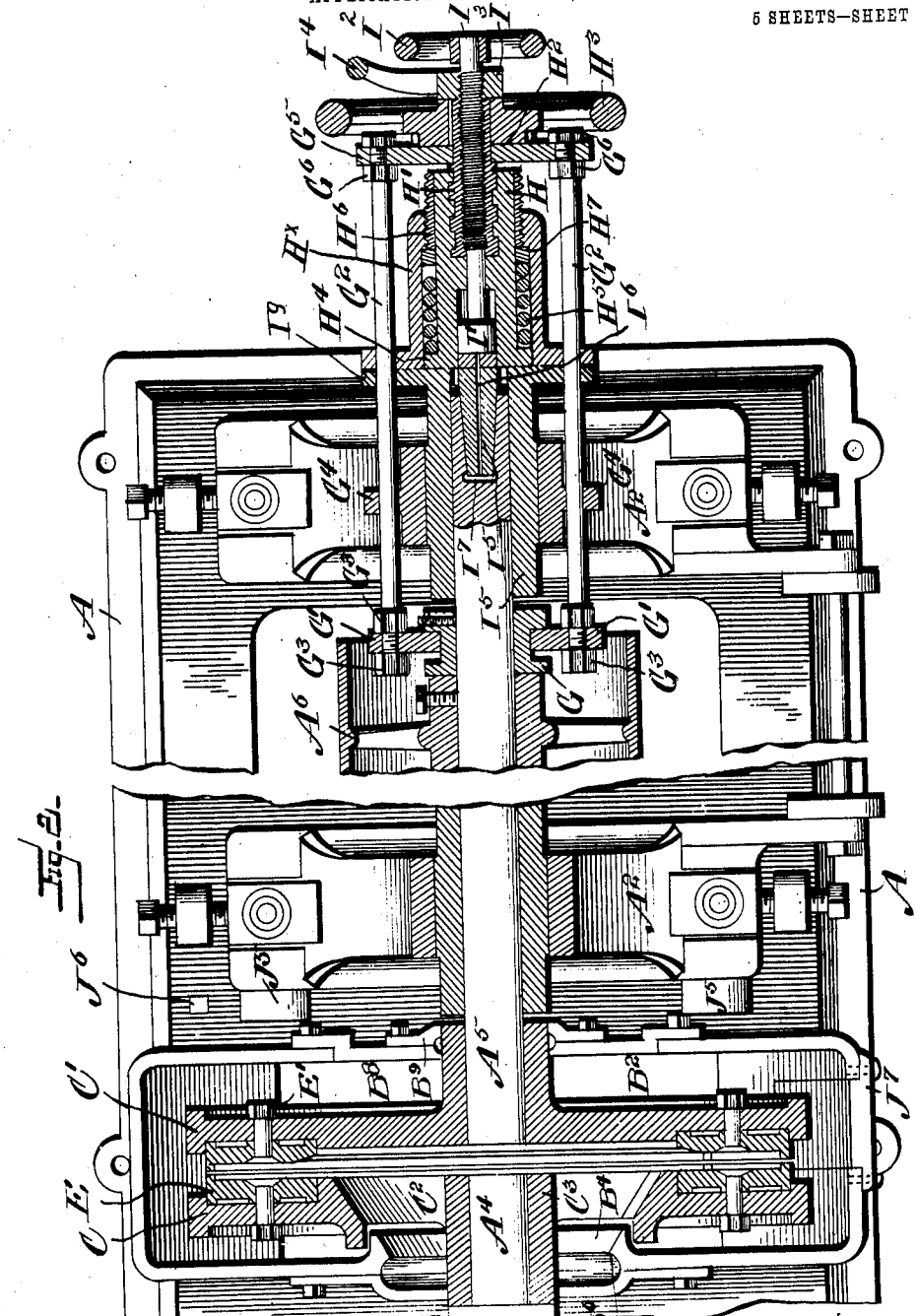

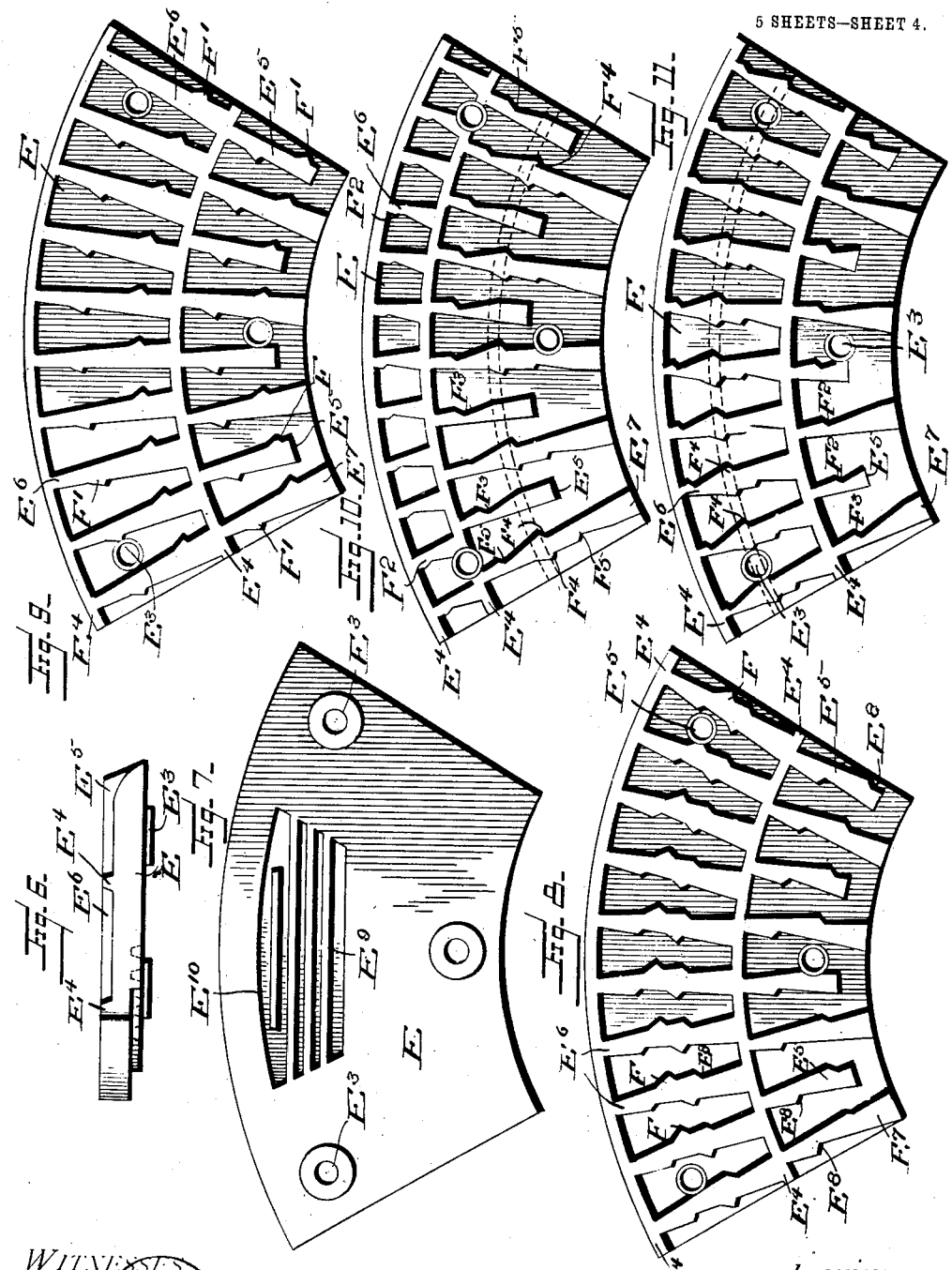

No. 826,711. PATENTED JULY 24, 1906.
A. F. DAVIS.
GRINDING MILL.
APPLICATION FILED MAY 16, 1904.

5 SHEETS—SHEET 5.

WITNESSES
INVENTOR
Albert F. Davis,
by E. N. Stocking
Attorney

UNITED STATES PATENT OFFICE.

ALBERT F. DAVIS, OF RUTLAND, VERMONT.

GRINDING-MILL.

No. 826,711.  Specification of Letters Patent.  Patented July 24, 1906.

Application filed May 16, 1904. Serial No. 208,200.

*To all whom it may concern:*

Be it known that I, ALBERT F. DAVIS, a citizen of the United States, residing at Rutland, in the county of Rutland, State of Vermont, have invented certain new and useful Improvements in Grinding-Mills, of which the following is a specification, reference being had therein to the accompanying drawings.

This invention relates to a grinding-mill, and particularly to a structure embodying opposing grinding-plates between which the material is introduced.

The invention has for an object to provide an improved construction of the grinding-plate by which the feed of the material from the center toward the outer edges of the plate is retarded and an opposing surface presented, so that the coöperating plates produce a shearing and grinding action to most effectually operate upon the material introduced therein.

A further object of the invention is to provide means by which these plates may be separated when a foreign substance calculated to injure the same contacts with the plates and to quickly remove the tension by which the plates are ordinarily held in contact with each other.

A further object of the invention is to provide means by which the casing inclosing the plates may be readily opened for access thereto when it is desired to renew the grinding-plates carried by the rotatable disks.

Another object of the invention is to provide means at the base of the feed-passage to the plates for catching and retaining particles of metal or other substances of greater weight than the material introduced into the mill to prevent the entrance thereof between the grinding-plates.

Another object of the invention is to provide a feed-agitator within the hopper of the mill to prevent a clogging of the feed and so constructed as to be capable of rotation whether the material is being fed to the mill or not.

Other and further objects and advantages of the invention will be hereinafter set forth and the novel features thereof defined by the appended claims.

Figure 13:
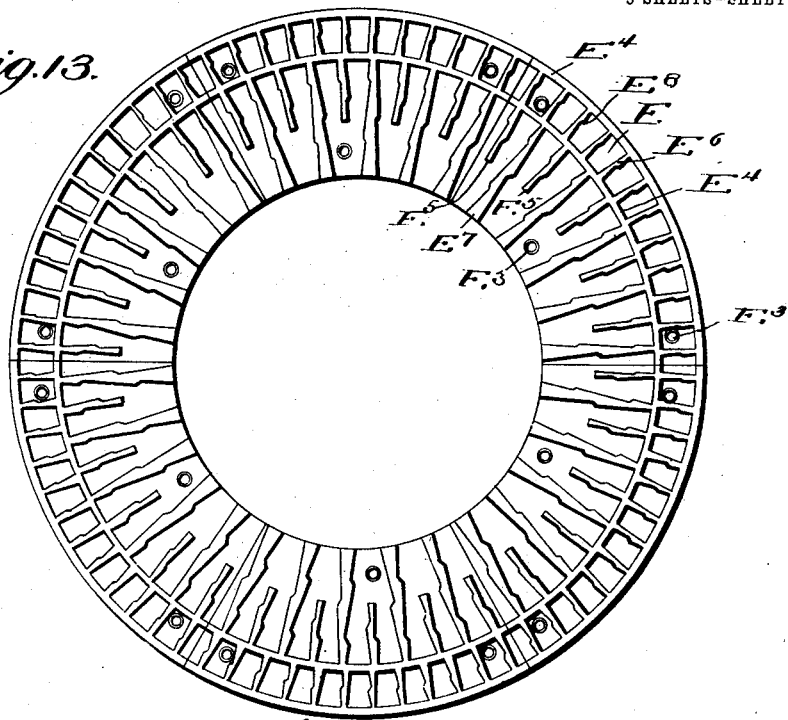
Figure 14:
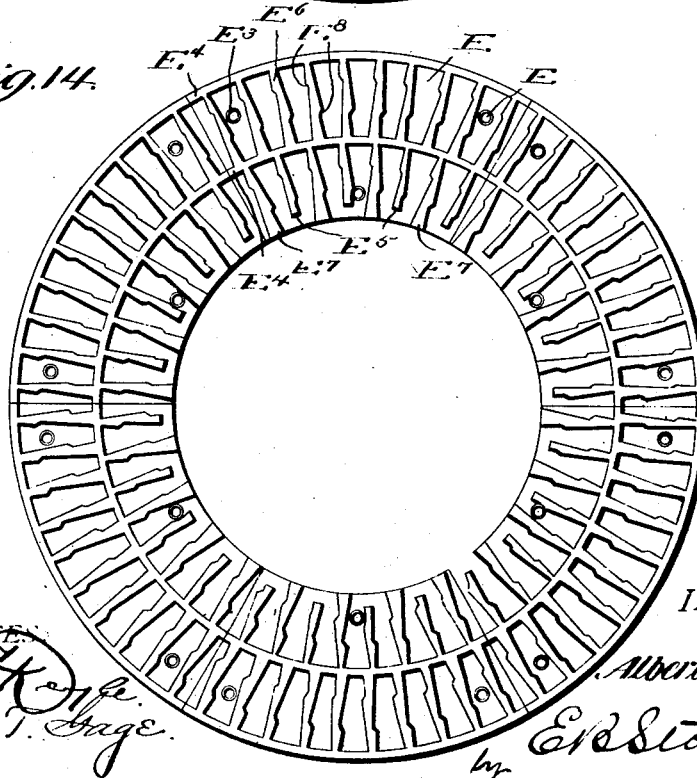

In the drawings, Figure 1 is a side elevation of the mill with parts broken away and the grinding-disks and feed-passages thereto shown in section; Fig. 2, a central horizontal section through the mill; Fig. 3, an end elevation thereof. Figs. 4 and 5 are plans of a preferred construction of coöperating grinding-plates adapted to be located opposite each other; Fig. 6, an edge view of one of said plates; Fig. 7, a bottom plan thereof. Figs. 8, 9, 10, and 11 are plans, respectively, of different modifications in the structure of grinding-plates, showing variable arrangements of the checks or shoulders upon the radial flanges carried by said plates; Fig. 12, a reduced detail of the detachable lever for opening the mill. Fig. 13 is an elevation of the plates shown in Fig. 4 assembled upon one disk, and Fig. 14 is a similar view of the plates shown in Fig. 5 upon the coöperating opposite disk.

Like letters of reference refer to like parts in the several figures of the drawings.

The letter A indicates the base of the mill, which may be of any desired construction and is provided with posts or standards A' and $A^2$ at opposite sides of the casing B, provided with bearing-boxes of any suitable construction adapted to receive the driving-shafts $A^4$ and $A^5$ for the rotatable disks C and C', respectively. Each of said shafts is provided with independent driving means—for instance, the band-wheels $A^6$ secured thereto. The casing B is composed of the upper section B' and the lower section $B^2$, the latter being secured to the base A and the former pivoted thereto at $B^3$. The disk C is provided with a central feed-opening $C^2$, surrounding the hub $C^3$ of the disk, and the casing at this point is provided with a feed-ring $B^4$, removably secured to the casing and communicating with the feed-spout $B^5$. This ring is provided with a central ridged portion $B^6$ to form a recess upon the outer side thereof, within which nails or other substances of greater gravity than the material to be ground will be caught and retained and from which they may be removed by means of the door-plate $B^7$, as shown in Fig. 1. The opposite disk C' is provided with a hub $C^4$, secured to the shaft $A^5$, and the casings B' and $B^2$ are each provided with a segmental plate $B^8$, removably secured thereto and carrying a stuffing-box ring $B^9$, as usual in this art. Communicating with the feed-spout $B^5$ is a feed-passage D, having a latch or feed plate D' extending diagonally across the same and adjustably secured by means of a screw $D^2$, mounted upon the outer wall of the feed-hopper $D^3$, said latch passing through a suitable opening D⁴ in the side wall of the passage D. Above the latch D' a rotatable ejector D⁵ is provided and comprises radial arms adapted to pass through the body of material contained in the throat of the hopper to prevent packing of the same and to insure a constant feed thereof. This ejector may be driven in any desired manner—for instance, by the shaft D⁶, provided with a pulley D⁷ upon its outer end, geared to a suitable driving-pulley upon the shaft A⁴.

Each of the disks C and C' is provided with the coöperating grinding-plates E, secured in position in any desired manner—for instance, by means of bolts E' passing through the plates and disks and secured by nuts E². A preferred construction of these plates is shown in Figs. 4, 5, 6, and 7, wherein it will be seen that each of the plates is provided with bolt-openings E³, extending therethrough, and with segmental flanges E⁴, extending concentric to each other and adapted, when assembled upon the disks to form circular flanges extending about the circumference of the disk, as shown in Figs. 13 and 14, the flanges E⁴ upon one of said disks being disposed at a greater distance apart than upon the other, so that when assembled the inner flange of each disk will not be in alinement, but will coöperate with the radially-disposed wedge-shaped ribs E⁵, E⁶, and E⁷, carried by each of the plates. The radial ribs E⁶ extend equal distances apart between the circular flanges E⁴, while the ribs E⁷ extend inward toward the axis of rotation from the inner circular flange. The ribs E⁵ are of less length than the ribs E⁷ and disposed intermediate thereof to coöperate with the inner flange E⁴ of the associated plate. Each of these radially-disposed ribs is provided upon one or more of its faces or sides with a check or shoulder E⁸, which tends to check the flow of the grain toward the periphery of the plate and to produce a shearing cut in connection with the inner flange of the coöperating plate, while the opposite plates are provided with a different number of radial ribs—for instance, as shown in Figs. 4 and 5, wherein a larger number of ribs is provided upon the plate shown in Fig. 4, so as to provide a greater grinding-surface at the periphery of the plates and to prevent any two ribs meeting in the same position, thus insuring a greater capacity to the mill and a reduction in the power required in the operation thereof. The character and position of the check or shoulder E⁸ provided upon each of the ribs may be varied as found desirable. For instance, in Figs. 4 and 5 the check is cut into the rib. The under surface of each of these plates is provided with a series of balancing-flanges E⁹, disposed in a recess E¹⁰, as shown in Fig. 7, which may be ground out or removed for the purpose of facilitating the balancing of the plate in assembling a series thereof upon the periphery of the disk, as it is essential that the disk should be properly balanced in order to secure an even motion in the grinding action.

In Fig. 8 a modified construction of plate is shown in which the checks or shoulders F may be provided upon the ribs E⁶ in connection with the checks E⁸ cut into the ribs E⁵ and E⁷, as before described.

In Fig. 9 a further modification of the checks upon the plate is shown, wherein the checks or shoulders F' project outwardly from all of the ribs E⁵, E⁶, and E⁷.

In Figs. 10 and 11 a further modification of two coöperating plates is shown, in which the plate E is provided with the concentric segmental flanges E⁴, those upon each plate being at a different distance apart, while the ribs E⁶ upon one plate are provided with checks or shoulders F² upon one side thereof and the ribs E⁵ with a similar shoulder F³ upon the opposite side, while the extended radial ribs E⁷ are provided at a point coincident to the inner flange E⁴ upon the opposing plate with oppositely-disposed shoulders or checks F⁴, which act as a shearing cut upon the inner flange E⁴ of the opposite plate, the position of said flanges being indicated by dotted lines in Figs. 10 and 11. The ribs E⁷ are also provided with the retarding-shoulders F⁵ upon opposite sides thereof, as described in connection with the other forms of the invention. The coöperating plate to that just described has the oppositely-disposed shoulders F⁴ located upon the ribs E⁶ to act in a similar manner in connection with the inner flange E⁴ of the first-mentioned plate. In other words, the arrangement of shoulders disposed upon the ribs E⁷ in one plate are duplicated upon the ribs E⁶ of the opposing plate, thus producing a structure in which no two ribs will meet in the same relative position and securing an even distribution of the grinding action and consequent wear over the entire surface of the plate as it performs a continual shearing cut, thus increasing the capacity of the mill and requiring less power than otherwise. All of the plates hereinbefore described are adapted to be used upon either of the disks in order that the direction of rotation of the disks may be reversed and the wear taken upon an opposite side of the ribs from that first used.

For the purpose of permitting a movement of one of the disks with its grinding-plate away from the other in the event of a foreign substance being introduced with the grinding material the shaft of the disk C' is shown as provided with a fixed grooved collar G thereon beyond the fixed driving-pulley A⁶ and carrying the movable flanged plate G', through which the release-rods G² extend and are adjustably secured, by means of nuts G³, at opposite sides of the plate. These rods pass through suitable guide-eyes G⁴, carried by one of the standards A², and at their outer end are passed through a plate G⁵ and secured thereto by nuts G⁶, similar to the nuts G³. The tension-head H˟ comprises a casing supported rigidly from the plate I⁹, secured to or formed with the bearing I⁸, carried by the bearing-standard by means of cap-screws I¹⁰, and is provided with a thrust-block H, adjustably held under tension by a spring H⁵, encircling the body of the block and bearing at one end against a flange H⁴ thereon and at its opposite end against a ring H⁷, adapted to be adjusted by the threaded sleeve H⁶, mounted in the casing, to bear upon the ring and adjust the tension of said spring. This block H is interiorly threaded to receive a release-screw H' of coarse pitch, which screw is also interiorly threaded to receive a regulator-screw I of considerably finer pitch and carrying a thrust pin or bearing I' for the shaft A⁵. The release-screw H' is provided with a quick-release wheel H³, keyed thereon, and passes through the plate G⁵, so as to rotate therein, while the coarse threads form a collar of sufficient diameter to engage the inner face of said plate in the rotation of the screw, and thus carry the plate longitudinally in the travel of the screw as unthreaded from the block, thereby transmitting a longitudinal movement to the collar G upon the shaft. The regulator-screw I and bearing carried thereby being mounted in the release-screw H' move simultaneously therewith, thus shifting the bearing I' to permit the longitudinal movement of the shaft, while the flange H⁴ remains in contact with the plate I⁹ and resists the thrust due to the operation of the release-screw. The tension of this spring H⁵ is adapted to be adjusted to any desired degree by means of the threaded sleeve H⁶ bearing upon the ring H⁷, which contacts with one end of the spring. The structure so far described permits the shaft to move longitudinally, carrying the head-block H therewith and placing the spring under tension, which restores the grinding-plate to its original position. It is, however, desirable to quickly release without affecting the tension of this spring, which is accomplished by rotation of the release-wheel H³ and the screw H', carried thereby, which, owing to the pitch of its thread, quickly withdraws the plates G⁵ and G' and the shaft as the screw H' unthreads from the head H, and its threads contact with the plate G⁵ and carry it longitudinally therewith, in which condition it may be held by means of a spring-catch H⁸, having a handle H⁹ in convenient position, and a tooth H¹⁰, adapted to engage teeth or notches H¹¹, carried upon the hub of the release-wheel H³.

The normal position of the grinding-plates relative to each other may be adjusted by means of the regulator-screw I, carrying at its inner end an end bearing I' for the shaft A⁵ and threaded through the release-screw H', so that when rotated by means of the hand-wheel I² the bearing I' and screw I will be jointly adjusted toward and from the end of the shaft. This regulator-screw may be held in its adjusted position by means of a set-nut I³, provided with an operating-handle I⁴, and the inner end of the screw is adapted to bear against a step I⁵, of suitable bearing material, which is provided with an interior aperture I⁶ for the purpose of feeding a lubricant to the bearing-face thereof, which aperture communicates with a feed-opening I⁷, extending laterally through the shaft and communicating with the oil-box of the bearing I⁸, carried by the standard.

When it is desired to open the mill for the purpose of repair or changing the grinding-plates therein, one of the disks may be swung outward, as shown in Fig. 3, by means of the standards A², which carry the adjustable shaft A⁵, said standards being pivotally mounted upon the base A by means of pivoting-ears J on the base of one side of the standards and similar ears J', carried by the base of the mill, through which a pivot or rod J² extends. These standards are securely held upon the base of the mill in the ordinary operation thereof by means of the set-screws J³, threaded in fixed lugs J⁴ on the base of the mill and bearing against the opposite sides of the standards to prevent any movement thereof under ordinary grinding conditions. For the purpose of swinging the pivoted members of the mill into the position shown in Fig. 3 a lifting-lever K has been provided, the end of which is adapted to extend through or beneath the lugs J⁵, carried at one side of the standards, while for the purpose of supporting the lever in an elevated position a leg or foot K' is pivotally mounted thereon at K² and provided with a reduced point K³, adapted to seat in a suitable recess or socket J⁶ in the base A of the mill. It will be seen that the parts may be elevated and supported in any desired manner, and the lever K is herein shown only as one convenient means of effecting the same. In swinging one of the disks outward, as shown in Fig. 3, it is desirable to provide a removable door or closure-plate J⁷ at the side of the lower portion of the casing toward which the disk is swung, as shown in Fig. 2, in order that the disk may pass beyond the edge of the lower case.

In the operation of the invention the opposite disks carrying the grinding-plates are rotated in opposite directions in the usual manner, one of said disks being provided with the feed-opening therethrough for the purpose of introducing the material to be ground between the disks and into contact with the opposite grinding-plates, while the other disk is mounted for a movement longitudinally with its shaft in the event of foreign substances becoming introduced between the plates, while it is normally held in proper position by means of the tension-spring. When it is desired to quickly release or separate the disks when a large foreign substance is introduced in order that the disks may stand away from each other to prevent injury by foreign material between the same, the latch of the release-wheel is thrown out and said wheel rotated, which, owing to the pitch of the release-screw, quickly withdraws the shaft of the movable disk by having a fixed bearing upon the end-bearing head and transmits motion through the plates and release-rods. The adjustment of this end bearing is effected by the adjustment of the threaded screw, which is threaded through the release-screw, as before described. This release-screw permits the disks to be quickly drawn apart and held in this position until restored, when the tension-spring is permitted to again act thereon, thus preventing injury to the plates. It will also be observed that the means provided for opening the mill permit ready access to the disk for the purpose of removing or repairing the plates thereon or for reversing them in position, which can be accomplished by disposing them upon an opposite disk to secure the use of both edges of the flanges and ribs upon the disks. The feed-agitator disposed in the feed-passage to the mill is so arranged as to be capable of operation whether the feeding-latch be open or closed, as in its operation it does not affect the feed of material to the mill, but merely prevents the clogging or massing of the same in the throat above the latch.

It will be obvious that changes may be made in the details of construction and configuration such as are within the skill of a mechanic familiar with this art without departing from the spirit of the invention as defined by the appended claims.

The millstone dress disclosed in this application is not claimed herein, being claimed in my divisional application of this case filed November 29, 1905, Serial No. 289,636.

Having described my invention and set forth its merits, what I claim, and desire to secure by Letters Patent, is—

1. In a grinding-mill, a disk composed of a series of segmental plates provided with a series of grinding-ribs upon one face and a series of parallel balancing-ribs upon the opposite face of the plates extending perpendicularly to a radius of said plates.

2. A grinding-plate provided with a series of grinding-ribs upon one face and a series of parallel balancing-ribs upon the opposite face of the plate extending perpendicularly to a radius of said plate.

3. In a grinding-mill, a longitudinally-movable shaft supporting a grinding-disk, means for maintaining the shaft under tension, a tension-head, an end bearing for said movable shaft, a release-screw supported by said tension-head and carrying the end bearing, a plate mounted on said screw to travel longitudinally therewith, and connections from said plate to the movable shaft to positively shift the latter.

4. In a grinding-mill, a longitudinally-movable driving-shaft supporting a grinding-disk, means for maintaining the shaft under tension, a tension-head, a release-screw supported by said tension-head, a plate upon said screw to travel longitudinally therewith, means for rotating said screw, a collar secured to said shaft, a plate loosely mounted upon said collar and rods extending between the screw-plate and collar-plate to shift said shaft.

5. In a grinding-mill, a disk provided with grinding-plates, a shaft for rotatably supporting the same, an opposite disk, a longitudinally-movable shaft supporting the same, means for maintaining the movable disk and shaft under tension, an end bearing for said movable shaft, a tension-head within which said bearing is mounted, a release-screw supported by said tension-head, means for rotating said screw, a latch for retaining said means in position, a threaded shaft for adjusting said end bearing, means for rotating said shaft, means for holding said shaft in adjusted position, a thrust-block within said head, a tension-spring disposed within the head and bearing upon a flange carried by said thrust-block, an adjusting-screw engaging said head to adjust the tension of said spring, a driving-pulley secured to said movable shaft, a sleeve secured upon said shaft and provided with a loosely-mounted flange thereon, a flange movable longitudinally with the release-screw, and rods extending between said flange carried by the release-screw and the flange upon the shaft-sleeve.

6. In a grinding-mill, a disk provided with grinding-plates, a shaft for rotatably supporting the same, an opposite disk, a longitudinally-movable shaft supporting the same, means for maintaining the movable disk and shaft under tension, an end bearing for said movable shaft, a tension-head within which said bearing is mounted, a release-screw supported by said tension-head, means for rotating said screw, a latch for retaining said means in position, a threaded shaft for adjusting said end bearing, means for rotating said shaft, means for holding said shaft in adjusted position, a thrust-block within said head, a tension-spring disposed within the head and bearing upon a flange carried by said thrust-block, an adjusting-screw engaging said head to adjust the tension of said spring, a driving-pulley secured to said movable shaft, a sleeve secured upon said shaft and provided with a loosely-mounted flange thereon, a flange movable longitudinally with the release-screw, rods extending between said flange carried by the release-screw and flange upon the shaft-sleeve, a bearing-step provided with a lubricating-passage therein and adapted to contact with said end bearing, and means for feeding a lubricant to said step.

7. In a grinding-mill, coöperating grinding-disks, a longitudinally-movable shaft for one of said disks, a sliding recessed thrust-block at the outer end of said shaft, an adjustable end bearing for said shaft carried within said block, a head-casing surrounding said block, a flange provided at one end of said block, a tension-spring disposed within the casing and bearing upon said flange, a releasing-screw threaded into said block and carrying said end bearing, a hand-wheel secured to said screw for rotating the same, and means for transmitting motion to said shaft from the releasing-screw.

8. In a grinding-mill, coöperating grinding-disks, a longitudinally-movable shaft for one of said disks, a sliding recessed thrust-block at the outer end of said shaft, an adjustable end bearing for said shaft carried within said block, a head-casing surrounding said block, a flange provided at one end of said block, a tension-spring disposed within the casing and bearing upon said block-flange, a releasing-screw threaded into said block and carrying said end bearing, a hand-wheel secured to said screw for rotating the same, means for transmitting motion to said movable shaft from the releasing-screw, a series of securing-teeth carried by the hub of said wheel, and a spring-latch secured to said casing to engage said teeth.

9. In a grinding-mill, coöperating grinding-disks, a longitudinally-movable shaft for one of said disks, a sliding recessed thrust-block at the outer end of said shaft, an end bearing for said shaft carried within said block, a head-casing surrounding said block, a flange provided at one end of said block, a tension-spring disposed within the casing and bearing upon said flange, a releasing-screw threaded into said block, a hand-wheel secured to said screw for rotating the same, means for transmitting motion to said shaft from the releasing-screw, a series of securing-teeth carried by the hub of said wheel, a spring-latch secured to said casing to engage said teeth, a threaded shaft extending from the end bearing through said release-screw, a hand-wheel upon the end of said threaded shaft, and a lock-nut disposed upon said threaded shaft to engage the hand-wheel of the release-screw.

10. In a grinding-mill, a rotatable disk having grinding-plates, a shaft therefor mounted in a bearing carried by a fixed standard, a coöperating disk having a driving-shaft, a standard for said driving-shaft pivotally mounted at one side of the mill to shift one disk in a parallel vertical plane to the other, and means carried by the base of the mill for engaging and retaining the pivoted standard in its normal position.

11. In a grinding-mill, a rotatable disk having grinding-plates, a shaft therefor mounted in a bearing carried by a fixed standard, a coöperating disk having a driving-shaft, a standard for said driving-shaft pivotally mounted at one side of the mill to shift one disk in a parallel vertical plane to the other, a casing for said disk having the upper portion thereof removable, and horizontally-disposed set-screws carried by lugs upon the base of the mill to engage the opposite sides of said standard when in a horizontal plane.

12. In a grinding-mill, a rotatable disk having grinding-plates, a shaft therefor mounted in a bearing carried by a fixed standard, a coöperating plate-disk having a driving-shaft, a standard for said driving-shaft pivotally mounted at one side of the mill, a casing for said disk having the upper portion thereof removable, set-screws carried by lugs upon the base of the mill to engage the opposite sides of said standards, and a removable section in the lower portion of said mill at the pivotal side of the standard.

13. In a grinding-mill, a rotatable disk having grinding-plates, a shaft therefor mounted in a bearing carried by a fixed standard, a coöperating plate-disk having a driving-shaft, a standard for said driving-shaft pivotally mounted at one side of the mill, a casing for said disk having the upper portion thereof pivoted at the opposite side from said pivoted standard, set-screws carried by the lugs upon the base of the mill to engage the opposite sides of said standards, a removable section in the lower portion of said mill at the pivotal side thereof, lifting-lugs extending laterally from said standards, and a lever adapted to engage beneath said lugs.

14. In a grinding-mill, a rotatable disk having grinding-plates, a shaft therefor mounted in a bearing carried by a fixed standard, a coöperating plate having a driving-shaft, a standard for said driving-shaft pivotally mounted at one side of the mill, a casing for said disk having the upper portion thereof removable, set-screws carried by lugs upon the base of the mill to engage the opposite sides of said standards, a removable section in the lower portion of said mill at the pivotal side thereof, lifting-lugs extending laterally from said standards, and a lever adapted to engage beneath said lugs.

15. In a grinding-mill, a grinding-disk, a shaft therefor, a pivotally-mounted standard for said shaft, lifting-lugs carried by said standards, and a lifting-lever to engage said lugs provided with a pivoted foot to engage the base of the mill.

16. In a grinding-mill, rotatable disks having driving-shafts, a casing surrounding said disks and having the upper portion thereof above the hub of the disks pivoted at one side thereof, a pivoted bearing-standard for one of said shafts, and a removable section to the lower portion of said casing at the same side thereof as the pivot of the standard.

17. In a grinding-mill, an apertured grinding-disk, a casing therefor, a feed-passage having a feed-ring leading to said disk and provided at its lower portion with a retaining-pocket below said ring, and means for removing material from said pocket.

18. In a grinding-mill, coöperating grinding-disks one of which is provided with a feed-opening adjacent to its hub, a casing having a feed-passage, and a removable feed-ring adapted to discharge into the opening in said disk and ridged upon its inner face to form a retaining-pocket in the feed-passage.

19. In a grinding-mill, coöperating grinding-disks one of which is provided with a feed-opening adjacent to its hub, a casing, and a removable feed-ring adapted to discharge into the opening in said disk and provided at its lower portion with a retaining-pocket.

20. In a grinding-mill, coöperating grinding-disks one of which is provided with a feed-opening adjacent to its hub, a casing, a removable feed-ring adapted to discharge into the opening in said disk and provided at its lower portion with a retaining-pocket, and a door at the lower portion of said pocket for discharging the contents thereof.

21. In a grinding-mill, coöperating grinding-disks, a casing therefor, a feed-passage leading to said disks, a rotatable agitator disposed to rotate in a vertical plane parallel and adjacent to one wall of said passage, and an adjustable latch-plate disposed diagonally to the vertical axis of said passage with its free end directly beneath said agitator.

In testimony whereof I affix my signature in presence of two witnesses.

ALBERT F. DAVIS.

Witnesses:
  M. C. WEBBER,
  P. L. WEBBER.